United States Patent Office 3,527,516
Patented Sept. 8, 1970

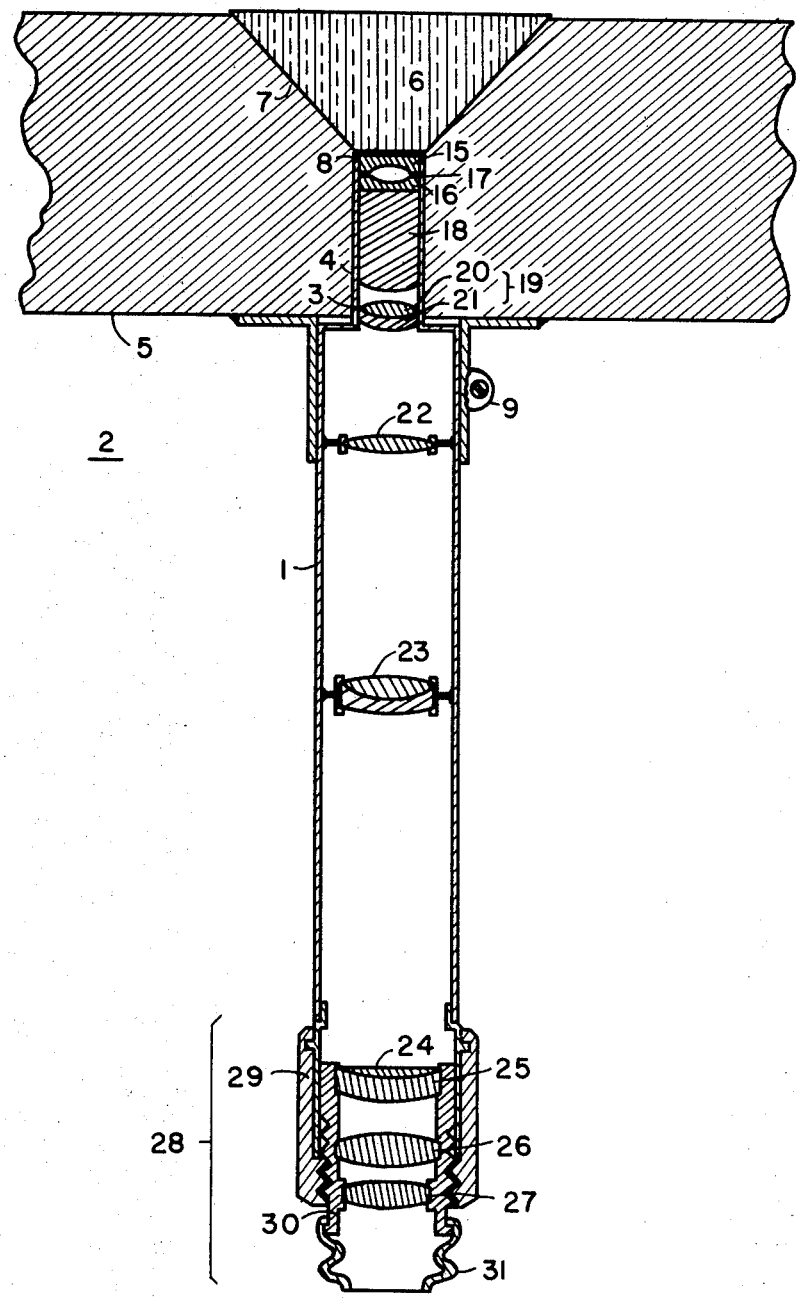

3,527,516
RESTRICTED APERTURE WIDE
ANGLE VIEWING SYSTEM
Carl Verne Muffoletto, 6100 Everall Ave.,
Baltimore, Md. 21206
Filed Jan. 5, 1968, Ser. No. 696,080
Int. Cl. G02b 21/00, 21/06
U.S. Cl. 350—54      1 Claim

ABSTRACT OF THE DISCLOSURE

A lens viewing system for wide-angle reception and efficient transmittal of optical information through the smallest practicable hole in a bulkhead of given thickness, and for relaying the information to an observer, comprising a thick tripartite objective lens assembly and a relay lens assembly, both assemblies being of minimal diameter and composed of lens elements individually similar in refractive index but disparate in dispersive power, and associated relay and eyepiece lenses of less restricted diameter.

---

This invention relates generally to lens systems and specifically to bulkhead-penetration type wide-angle viewing systems.

The viewing system described here is an embodiment of the invention made for, and presently used in, a deep submergence underwater vehicle.

A principal object of the invention is to provide occupants in the cabin of the vehicle with a natural view of their underwater surroundings despite the smallness of diameter of the hole through the thick hull of the vehicle, provided to connect the cabin with the pressure window on the exterior of the hull.

Another object of the invention is to provide a viewing system of the type described which will pass the widest angular field of view consistent with a bright image.

Yet another object of the invention is to provide a viewing system of the type described which, in use, will introduce minimum perspective distortion and minimum change in overall magnification.

Briefly described, this embodiment of the invention consists of an optical tube containing a centered optical system including a wide-angle objective lens assembly, a relay system, and an eyepiece. The objective lens assembly and the first relay lens of the relay system are positioned within the the hole in the hull of the vehicle connecting the cabin with the pressure window. These lenses are consequently of severely restricted diameter. The other lenses of the viewing system are contained in a portion of the optical tube which protrudes into the cabin where there is more space available, and are of considerably larger diameter.

Essence of the invention therefore consists in provision of a lens viewing system for wide-angle reception and efficient transmittal of optical information through the smallest practicable hole in a bulkhead of given thickness, and for relaying the information to an observer, comprising a thick tripartite objective lens assembly and a relay lens assembly, both assemblies being of minimal diameter and composed of lens elements individually similar in refractive index but disparate in dispersive power, and associated relay and eyepiece lenses of less restricted diameter.

The objects and advantages of this invention will become better understood from a study of the figure, which is a plan view, in section, of an embodiment of the viewing system installed in a deep submergence vehicle.

In the figure, optical tube 1 holds the elements of the viewing system securely in spaced relation. The tube is sealed to exclude moisture and dust. The larger part of the optical tube protrudes into the cabin area 2 of the vehicle. The restricted diameter section 3 of the optical tube protrudes into cylindrical hole 4 penetrating the hull or pressure bulkhead 5 of the vehicle, centrally of the wide-angle pressure window 6.

The pressure window, which is not a part of this invention, is made of Plexiglass (or other light transmitting window material) in the shape of a truncated cone, and is fitted into a conical recess 7 in the exterior of the bulkhead.

To take advantage of the full field of the viewing system it is necessary to position the objective end 8 of the optical tube close to the truncated end of the pressure window. Excess separation here will diminish the field of view, although allowance must be made for swelling of the pressure window at depth. The problem of the space between the telescope objective and the window may be solved by placing the inner face of the window and the outer face of the objective, by use of an expansion cell, in contact with a liquid or non hardening plastic material having an index of refraction near that of the window and objective.

An adjustable positioning means such as clamping bracket 9 attached to the bulkhead is used to secure the optical tube in position.

Conventional methods of mounting the lenses in the optical tube are used throughout. Since these are well known in the art, no description of mounting details will be given here, and mountings will be diagrammatically indicated in the drawing.

The interior of the optical tube is provided with a black, roughened surface, not shown, to prevent stray reflection.

The objective lens assembly of this invention is mounted at the extreme objective end of the optical tube, and comprises a pair of substantially identical plano-concave lanthanum glass lenses 15 and 16 mounted with concave faces together, separated by a thin annular baffle 17. The baffle serves to prevent stray light from entering the system; it is made of a thin opaque substance such as blackened metal foil.

A plano-convex flint glass lens 18, of exaggeratedly thick proportion is cemented at its plane end in contact with the plane surface of lens 16. The thickness of this element is substantially greater than its diameter; in a sense, it serves as a "light pipe."

Spaced slightly away from the end of lens 18 is a doublet relay lens 19 composed of a double convex lanthanum glass element 20 optically cemented to a concavo-convex flint glass element 21.

In addition to serving as a relay, lens 19 also removes residual spherical and chromatic aberrations left by the objective.

All the lenses described thus far are of a uniform minimal diameter to provide for transmittal of the received radiation through the smallest practicable diameter hole in the bulkhead.

The flint glass used in making these lenses has an index of refraction $n_d=1.728$ and a dispersion $v=28.4$. The lanthanum glass used has an index of refraction substantially the same as the flint glass, that is, of about $$n_d=1.720$$

but the dispersion of the lanthanum is entirely different from that of the flint, being $v=50.4$.

From this point on, the optical train is outside the bulkhead and there is no particular restriction in the diameter of the optical tube or its elements, beyond that of convenience.

Starting with lens 22 then, the succeeding lenses are substantially larger in diameter than those previously described. Lens 22 is a simple lens of flint glass, and functions as a field lens. Lens 23 is an achromatic doublet relay lens like lens 19 in construction and material.

The remaining lenses 24, 25, 26 and 27 comprise a conventional set of Erfle eyepiece optics, except that lens 24 is a field lens of lanthanum glass affixed at the front surface of lens 25 of the eyepiece.

The eyepiece assembly 28 includes a focusing holder 29 and 30, mounted to the optical tube, and a removable eye shield 31.

All air-interface surfaces of the lenses described are anti-reflection coated.

The viewing system functions as follows: The first surface of the objective lens assembly accepts radiation from the field of view defined by the conical pressure window, and the two concave surfaces produce a diminished, erect negative image of the exterior scene.

The first doublet lens receives the light from the lanthanum positive element of the objective lens and focuses it, forming an achromatized inverted real image at the first field lens. The succeeding doublet lens then relays the image to the plane of the second field lens and erects the image. The eyepiece then presents the erect image to the observer's eye.

The exact curvatures, spacings, and materials of the lenses of the viewing system of this invention will depend upon the specifications of the particular application.

The embodiment herein described met or surpassed all the following performance and dimensional specifications, to which it was constructed (for example, objects as close as the outer surface of the Plexiglass pressure-window may be viewed):

TABLE I.—PERFORMANCE AND DIMENSIONAL SPECIFICATION:

Total angular field seen through the system in air: 100°
Magnification:
    Not less than 2/3
    Not greater than 1.0
Resolution by normal eye, on axis, in air, between 22.0 feet and 23.0 feet from the objective: 5 min.
Transmittance of luminous flux incident on the objective, not less than 50%
Contrast transmittance of target luminance in relation to background luminance $C=(N_T-N_B)/N$: 60%
Eye relief, pupil to lens: 0.75 in.
Maximum diameter of optical tube in bulkhead: 0.937 in.
Length of optical tube in bulkhead: 2.925 in.
Diameter of optical tube in cabin: 2.00 in.
Diameter of eyepiece: 2.25 in.
Overall length of optical tube and eyepiece in cabin: 16.60 in.

To meet the above specifications, the lenses were constructed in the following dimensions, the surfaces being described in sequence from the first objective surface to the eyepiece.

TABLE II.—LENS DIMENSIONS (MM.)

| Lens | Thickness | Radius | Clear aperture | Diameter |
|---|---|---|---|---|
| Plano-concave | 2.0 | (¹) 14.5 | 18.0 | 22.0 |
| Plano-concave | 2.0 | 14.5 (¹) | 18.0 | 22.0 |
| Plano-convex | 38.0 | (¹) 59.4 | | 22.0 |
| Double-convex | 7.0 | 44.9 15.2 | | 22.0 |
| Concavo-convex | 2.0 | 15.2 44.9 | | 22.0 |
| Double-convex | 7.5 | 55.6 55.6 | | 35.0 |
| Double-convex | 10.0 | 107.0 19.6 | | 30.0 |
| Concavo-convex | 2.0 | 19.6 59.4 | | 30.0 |
| Plano-convex | 4.3 | (¹) 101.5 | | 43.0 |
| Eyepiece | (²) | (³) | | |

¹ Plane.
² Wide angle.
³ Erfle, 32mm. f. 1.

This invention is not limited to the above embodiment nor to the application described, but rather, with adaptations obvious to those skilled in the art, will be found suited for many other uses.

For example, with slight modifications, the viewing system will be found well adapted for inspecting the interiors of radiation chambers, high-pressure gas vessels, and the like. Further, the system will be found useful for making observations in the ultra-violet and near infra-red wavelengths as well as in the visible. It is, therefore, to be understood that within the scope of the appended claim the invention may be practiced otherwise than as specifically described.

What is claimed is:

1. A wide-angle viewing system having a field lens, a relay lens assembly, an eyepiece, and an objective lens assembly all supported by an optical tube, said objective lens assembly comprising two identical plano-concave lenses of lanthanum glass having refractive index of substantially 1.720 and dispersive index of 50.4, the concave faces of the two said lenses being fixed substantially together in adjacent juxtaposition and separated by an annular baffle of substantially foil-thickness; and a plane convex lens of flint glass having refractive index of 1.728 and dispersive index of 28.4, the plane face of said plano-convex lens being mounted in optical contact with the plane face of a said plano-concave lens opposite the object side of said assembly, and the dimensions of all said lenses being in the relative proportions:

| Lens | Thickness | Radii | Clear aperture | Diameter |
|---|---|---|---|---|
| Plano-concave | 2.0 | Plane 14.5 | 18.0 | 22.0 |
| Plano-convex | 38.0 | Plane 59.4 | | 22.0 |

(References on following page)

References Cited

UNITED STATES PATENTS

| | | | |
|---|---|---|---|
| 2,538,077 | 1/1951 | Blosse | 350—230 X |
| 2,956,475 | 10/1960 | Harris et al. | 350—230 X |
| 3,012,476 | 12/1961 | Zimmermann et al. | 350—176 |
| 886,416 | 5/1908 | Rudolph | 350—208 |
| 1,716,308 | 6/1929 | Foster | 350—208 |
| 1,848,788 | 3/1932 | Loeck | 350—54 |
| 2,423,267 | 7/1947 | Strang | 350—52 |
| 2,899,862 | 8/1959 | Baker | 350—54 |

FOREIGN PATENTS

| | | |
|---|---|---|
| 37,795 | 4/1936 | Netherlands. |
| 1,464,088 | 12/1966 | France. |
| 132,303 | 9/1919 | Great Britain. |
| 1,431,914 | 2/1966 | France. |

PAUL R. GILLIAM, Primary Examiner

U.S. Cl. X.R.

350—27, 17